United States Patent [19]

Giulio et al.

[11] Patent Number: 4,478,569
[45] Date of Patent: Oct. 23, 1984

[54] MACHINE FOR FORMING UNBROKEN RINGS OF DOUGH

[75] Inventors: Folli Giulio, Conselice-Ravenna; Casadei Marino, Cesena, both of Italy

[73] Assignee: Folli Giulio & Dante, di Folli Giulio, Folli Benzo & Preti Fosca s.n.c., Conselice-Ravenna, Italy

[21] Appl. No.: 506,119

[22] Filed: Jun. 20, 1983

[30] Foreign Application Priority Data

Jul. 30, 1982 [IT] Italy ................................ 5013/82[U]

[51] Int. Cl.³ .......................... A21C 3/02; A21C 3/08; A21C 9/08
[52] U.S. Cl. ................................. 425/324.1; 425/363; 425/375
[58] Field of Search ............... 425/319, 334, 335, 320, 425/322, 363, 375, 324.1; 426/499, 500, 501

[56] References Cited

U.S. PATENT DOCUMENTS

| 1,903,570 | 4/1933 | Kremmling | 425/375 |
| 1,998,560 | 4/1935 | Smith | 425/334 |
| 2,149,173 | 2/1939 | Hartman et al. | 425/375 |
| 2,291,457 | 7/1942 | Farmer | 425/375 |
| 2,310,463 | 2/1943 | Russell | 425/499 |
| 2,478,199 | 8/1949 | Lyon | 425/375 |
| 2,479,864 | 8/1949 | Rhodes | 425/501 |
| 2,584,514 | 2/1952 | Thompson et al. | 425/334 |
| 2,853,029 | 9/1958 | Wilson | 426/501 |
| 2,888,888 | 6/1959 | Jorgenson et al. | 426/501 |
| 3,081,487 | 3/1963 | Heffner et al. | 425/375 |
| 4,388,264 | 6/1983 | Leuvelink | 425/334 |

FOREIGN PATENT DOCUMENTS 7401219  7/1975  Netherlands ....................... 425/375
2448 of 1901  United Kingdom .

Primary Examiner—Willard E. Hoag
Attorney, Agent, or Firm—Balogh, Osann, Kramer, Dvorak, Genova & Traub

[57] ABSTRACT

Disclosed herein is a structure of an extremely compact machine for forming unbroken rings of dough, in which, with the exception of deviation elements, the drive and guide elements customarily provided between the devices that manipulate the moistened and kneaded flour and those that form the dough into shaped pieces, have been eliminated by positioning the thinning rollers directly overhead of the tubular elements that form the shapes, so that the said strips flow by gravity into the said tubular elements.

Another feature of the invention is that, despite the simplicity of the machine, means are provided that make it possible to regulate, within relatively ample limits, the dimensions of the formed pieces of dough.

6 Claims, 8 Drawing Figures

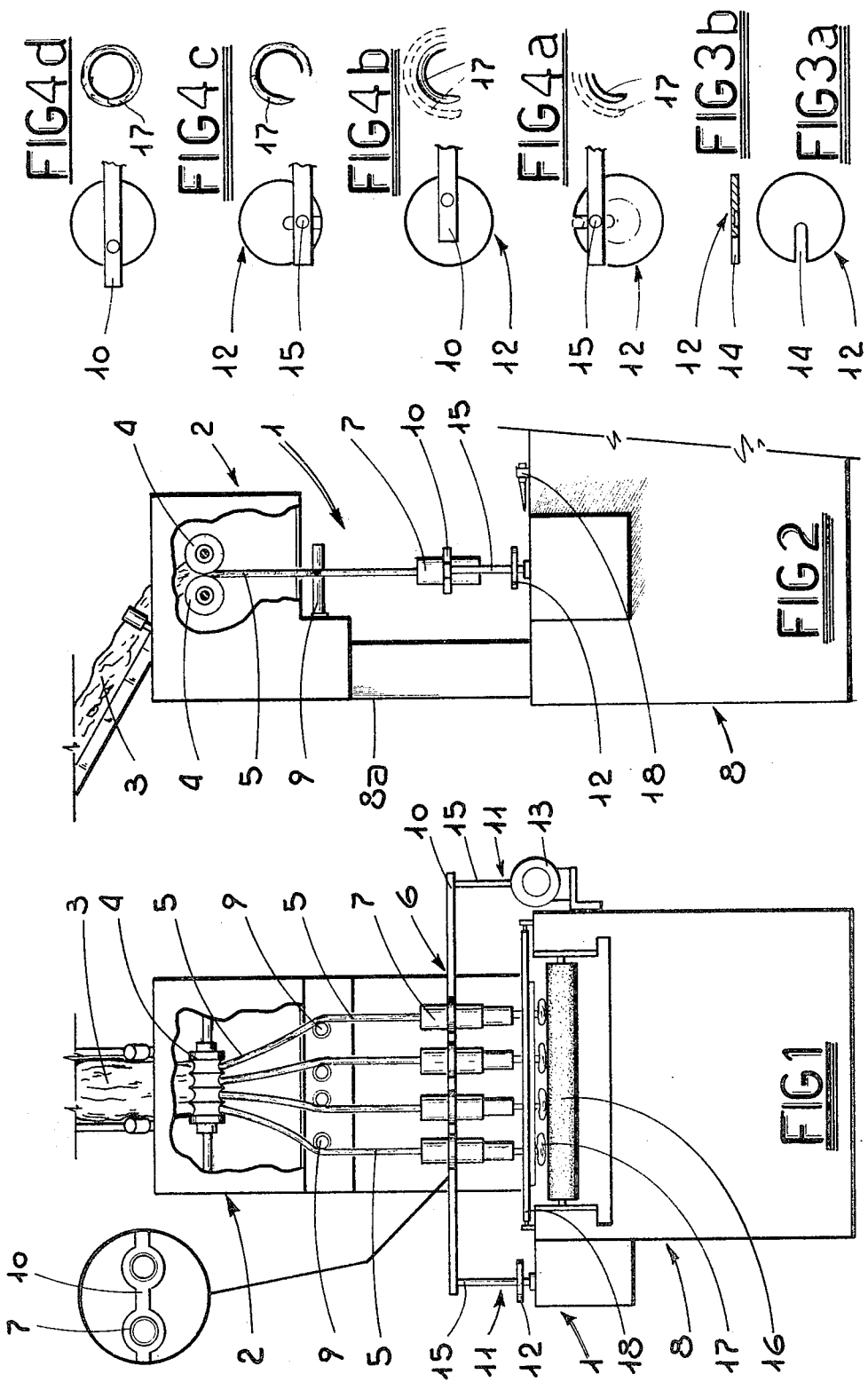

MACHINE FOR FORMING UNBROKEN RINGS OF DOUGH

BACKGROUND OF THE INVENTION

The invention relates to the structure of a machine for forming unbroken rings of dough.

DESCRIPTION OF THE PRIOR ART

The machines that form unbroken rings of dough have, as is known (see for example Italian patent application No. 3353 A/80), fundamentally a structure defined by a number of successive processing stations aligned, one with respect to the other, in a prevalently horizontal direction. In particular, the said machines are provided with a first processing station defined by devices for manipulating the moistened and kneaded flour and for forming the strips of dough there from, and with at least a second processing station in which the said strips of dough are so positioned as to form pieces of dough of the required shape.

The said first station comprises the "thinning rollers" that form a plurality of strips of dough, one at the side of the other, while the said second station comprises the tubular elements that receive the strips of dough and by oscillating suitably place them on a conveyor that carries the said strips to the subsequent processing stations after they have been cut or divided into segments.

In the known machines, these two stations are aligned one with the other in a horizontal direction, and thus it is necessary that special elements be provided for driving the strips towards the said tubular elements, conveyor belts for example.

The presence of the said drive elements not only increases considerably the volume of the machine in question but also the technical complexity thereof, since it is essential for the said elements to be constructed in such a way as to void tension on the strips of dough or kinking.

It should also be noted that the presence of the said drive elements and any partial curling of the strips of dough that may be caused by them can render necessary the adoption, in the said second station, of relatively complex tubular elements in order to prevent the strips of dough flowing therein from being subjected to further tension.

SUMMARY OF THE INVENTION

The general object of the invention is, in view of the foregoing, to create a new structure for a machine for forming unbroken rings of dough that is essentially simple yet prevents the aforementioned problems from occuring.

One particular object within the framework of the general object of the invention is to create a structure for a machine that forms dough into shaped pieces, of a minimum volume, constituted by a particularly reduced number of parts.

Another particular object of the invention is to create a structure for a machine that forms dough into shaped pieces, in which the tubular elements that define the shape of the pieces of dough can, despite being of a particularly simple structure, be adjusted at will in such a way as to obtain pieces of dough in shapes of various sizes.

These objects and others too that will become more apparent from the ensuing text are attained by the structure according to the invention for a machine for forming unbroken rings of dough, in particular of the type wherein strips of dough are delivered by manipulation devices comprising thinning rollers, and the said shaped pieces of dough are produced by means of forming devices comprising tubular elements that are supplied with the said strips and oscillate above a terminal conveyor, and wherein the said thinning rollers are positioned directly overhead of the said tubular elements so as to cause the said strips of dough to flow by gravity into the said tubular elements.

BRIEF DESCRIPTION OF THE DRAWINGS

Further characteristics and advantages will be seen more clearly from the detailed description of one preferred but not sole embodiment of the invention, illustrated purely as in example on the accompanying drawings, in which:

FIG. 1 shows, in a front view, the machine according to the invention;

FIG. 2 shows, in a lateral view, the said machine;

FIGS. 3a and 3b show, in a plan view and in sectional form, respectively, one detail of the machine according to the invention;

FIGS. 4a, 4b, 4c and 4d show, diagrammatically, the operation of the machine in relation to the detail illustrated in FIGS. 3a and 3b.

DESCRIPTION OF THE PREFERRED EMBODIMENT

With reference to the above listed figures, the machine according to the invention is shown globally at 1. Comprised therein, in a way in itself known, are the manipulation devices 2 of the moistened and kneaded flour 3, in which are inserted two grooved thinning rollers 4 designed to form dough into strips 5.

In a way again with itself known, the machine comprises devices 6 for forming the dough into shaped pieces, this being done by tubular elements 7 that can oscillate and through which the strips of dough 5 pass coaxially.

Special operating means cause the rotation of the thinning rollers 4 and the oscillation of the tubular elements 7.

According to one characteristic of the invention, a frame 8 is envisaged and this extends into a column 8a for supporting the manipulation device, so that this be placed directly above the tubular elements 7.

In detail, the thinning rollers 4 are placed side by side along a horizontal plane, and the reciprocal contact area of these is situated in a vertical plane that passes exactly through the tubular elements 7, as shown in FIG. 2.

Furthermore, provision is made for essentially horizontal axis deviation elements 9 that divaricate, one with respect to the other, the strips 5 in such a way that terminally they are made to flow exactly above the tubular elements 5, as can be seen in FIG. 1.

It is envisaged for the forming devices 6 that the tubular elements 7 be advantageously connected, one to the other in an integral fashion, through a virtually horizontal bar 10 that is perpendicular to the tubular elements and can be oscillated under the action of mechanical elements 11 that engage the extremities of the said support bar 10. The mechanical elements 11 are visible in FIG. 1 and comprise disks 12 that are placed essentially at right angles to the vertical and, driven by a motor 13 (FIG. 1), can rotate around their center axis. The disks 12 are provided with a radial flute 14 into which goes inserted an adjustable position pin 15, the end part of which is inserted into the support bar 10.

FIG. 1 gives emphasis, furthermore, to the fact that the machine is, in particular, provided in a way in itself known, with a conveyor 16 that sends away the formed pieces 17 once they have been cut by a shearing bar 18.

The operation of the machine according to the invention takes place as follows.

The thinning rollers 4 form, in a way in itself known, the strips of dough 5 and just as soon as they are made, the said strips are made to drop by gravity directly onto the tubular elements 7.

Inserted along the path followed by the strips 5 are the deviation elements 9 which, by expanding the said strips slightly in the form of spokes, render precise the insertion into the tubular elements 7.

The latter oscillate in order to shape the pieces 17, keeping their axes exactly vertical under the control of the disks 12 and the pins 15. In particular, one of the disks 12 idles around the axis thereof while the other is controlled by the motor 13.

The pins 15 can be positioned in the flutes 14 of the disks 12 in such a way as to obtain pieces 17 of the required size. This can be seen, in particular, in FIGS. 4a and 4b where it is made clear that the setting of the pins 15 in the region of the edges of the disks 12 leads to the formation of pieces 17 of more ample dimensions.

The invention fulfills the proposed objects. Indeed, it is able, despite the structure being very simple, to prevent essentially the strips 5 being subjected to tension or to kinking, and to do this to the degree whereby the oscillations of the tubular elements 7, even in the region of the upper mouthpiece extremities of these for the strips 5, are rendered acceptable and non prejudicial.

Thanks to the elimination, with the exception of the deviation elements 9, of drive and guide elements between the manipulation devices 2 and the forming devices 6, the machine is extremely compact.

To conclude, it should be noted that despite the simplicity of the machine, it is possible to regulate within relatively ample limits, the dimensions of the formed pieces of dough.

In practice, the materials used can be any, depending on the requirements, as can also be the shapes and sizes.

What is claimed is:

1. Structure of a machine for forming unbroken rings of dough from strips of dough which is delivered by manipulation devices, comprising thinning rollers for thinning and separating the dough into strips, shaped pieces of dough being produced by means of forming devices comprising tubular elements that are fed with said strips, means for supporting and oscillating said forming devices above a terminal conveyor, and wherein the said thinning rollers are positioned directly above said tubular elements so as to cause the said strips of dough to flow by gravity into the said tubular elements.

2. Structure according to claim 1, including deviation elements for directing said strips along a downward trajectory towards the tubular elements, said deviation elements being designed to divert, one with respect to the other, said strips of dough in order to guide them towards the said tubular elements.

3. Structure according to claim 1 or 2, wherein said thinning rollers are placed with parallel axes along an essentially horizontal plane, and an essentially vertical plane that passes through said thinning rollers essentially passes through said tubular elements.

4. Structure according to claim 2, wherein said deviation elements are substantially bars having essentially horizontal axes, interposed between said thinning rollers and said tubular elements.

5. Structure according to claim 1 or 2, wherein said tubular elements are connected, one to the other in an integral fashion, by a support bar restrained, at the extremities thereof, by mechanical elements designed to cause the said support bar to oscillate in an essentially horizontal plane.

6. Structure according to claim 5, wherein said mechanical elements are constituted by disks rotatable around an essentially vertical axis of rotation and provided with radial flutes designed to accept the lower extremity of pine, said pin having a lower extremity that can be positioned along the said flutes and an upper extremity that is inserted into said support bar.

* * * * *